Inventor
ERWIN M. GULOW

Aug. 17, 1948.  E. M. GULOW  2,447,409
DELIVERY CABINET
Filed Aug. 11, 1945  2 Sheets-Sheet 2
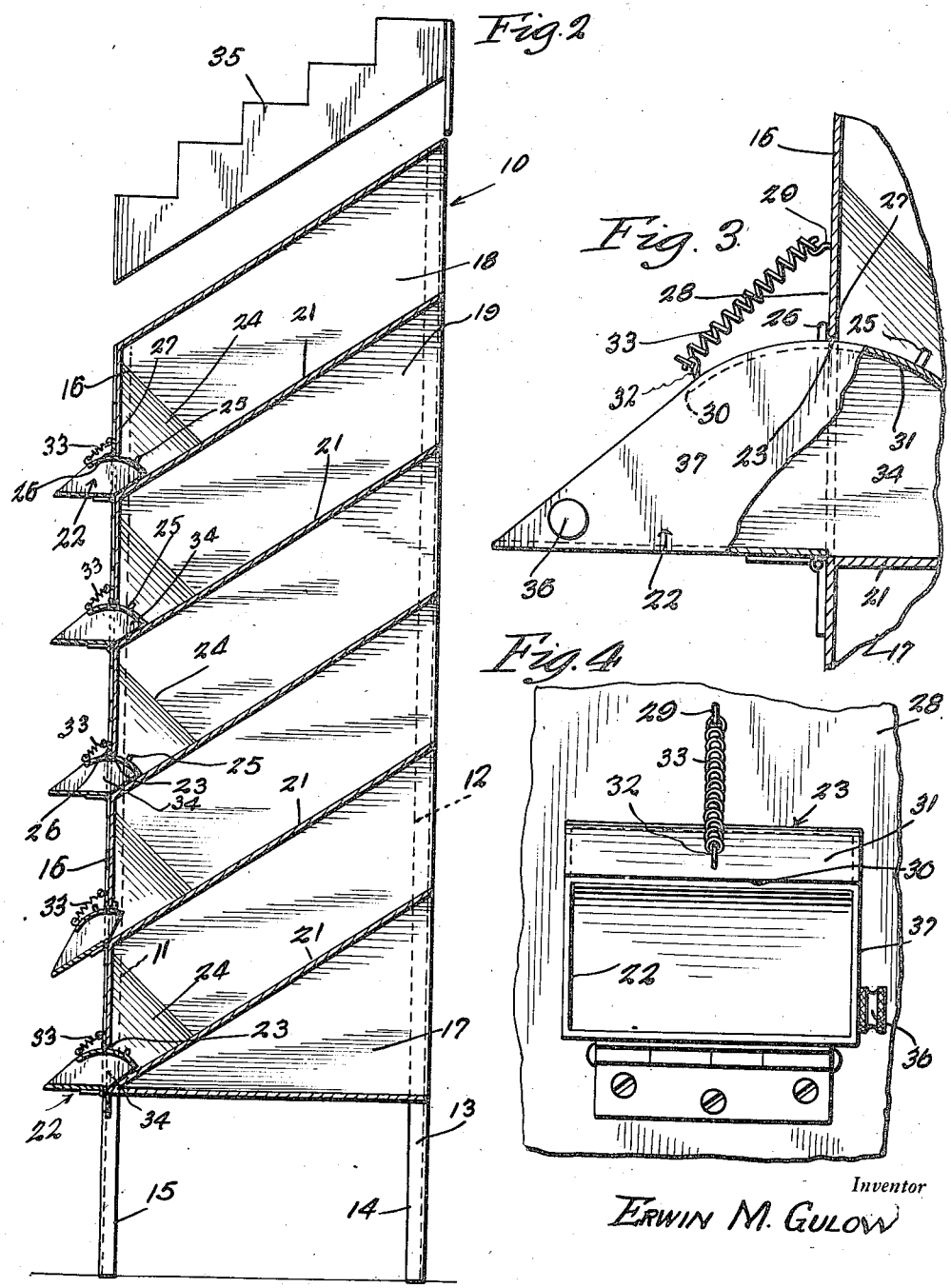
Inventor
ERWIN M. GULOW
By Clarence A. O'Brien
and Harvey B. Jacobson
Attorneys Patented Aug. 17, 1948

2,447,409

UNITED STATES PATENT OFFICE 2,447,409

DELIVERY CABINET

Erwin M. Gulow, Turners Falls, Mass.

Application August 11, 1945, Serial No. 610,224

1 Claim. (Cl. 222—129)

This invention relates to improvements in cabinets and has for its object to provide a seed dispensing cabinet.

Another object of the invention is to provide a cabinet for dispensing seed or other granular material and having means for displaying the material of each compartment in the cabinet.

Another object of the invention is to provide a cabinet containing a number of bins and means whereby the material therein will not adhere to the walls of said bins.

Other features and advantages will become more readily apparent from the following description and the accompanying illustrative drawings in which:

Figure 2 is a section taken on line 2—2 thereof,

Figure 3 is an enlarged detailed view of a delivery spout, and

Figure 4 is a front elevation view thereof.

Figure 1:
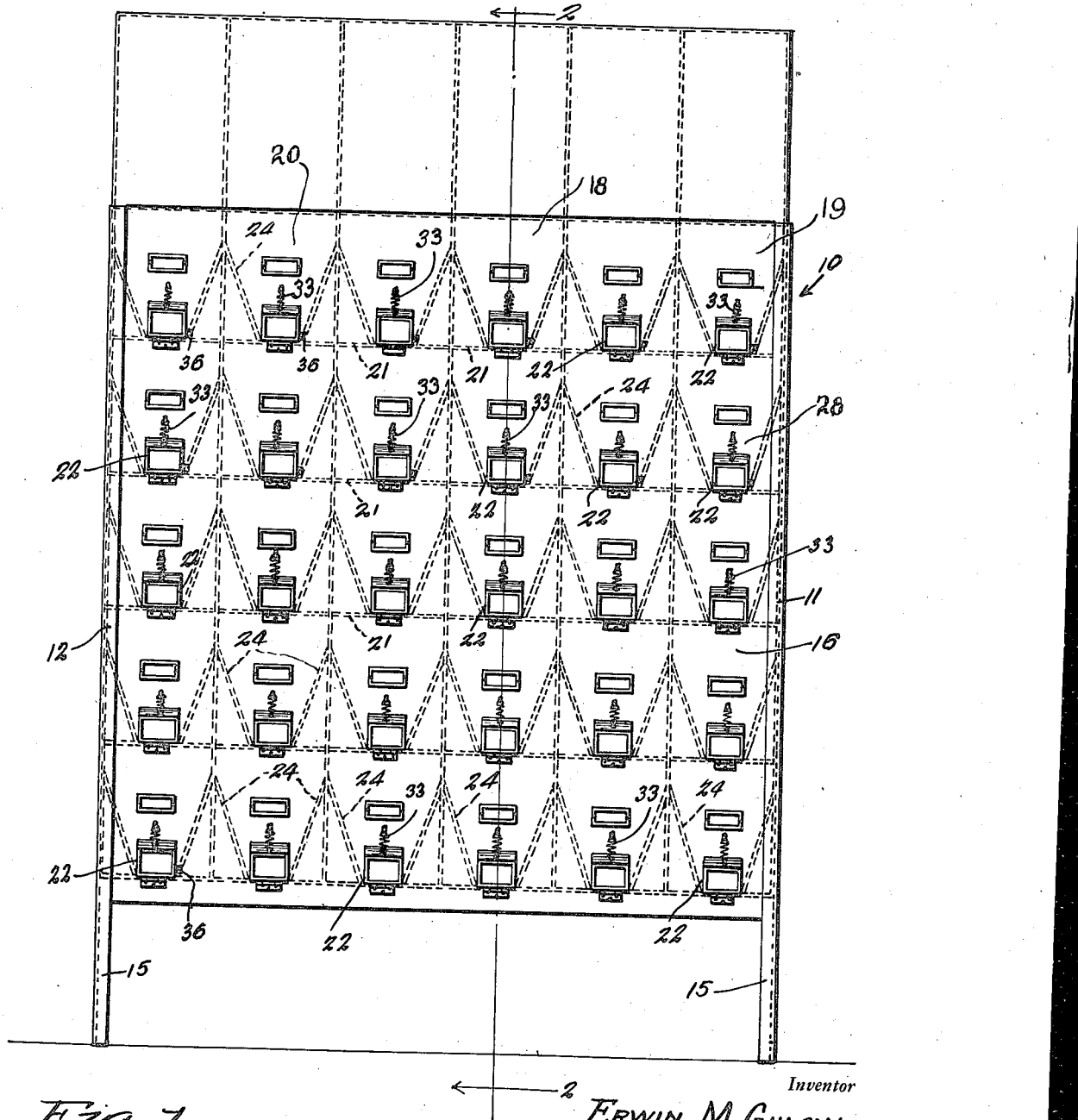
Figure 1 is a front elevational view of my improved cabinet.

In the accompanying drawings as above enumerated and in the following specification, like characters of reference indicate like parts throughout and in which 10 indicates my improved cabinet which is formed of angle iron frame members 11, 12, 13, etc., which extend down to form legs 14 and 15, and which frame members form supports for the preferably galvanized iron walls 16 and 17, etc. The interior of the cabinet is divided into a plurality of vertically arranged columns of bins 18, 19, 20, etc., the bottom walls 21, of which are inclined to such an extent that the material contained in the bins will freely flow to the front wall 16. In each of said front walls is hingedly mounted a spout 22, the rear portion of which extends through opening 23 into filler pieces 24, of said bins. Each of the spouts 22, on the upper walls thereof are provided with stops 25 and 26. The stop 25 being on the inner wall of the spout so as to engage inner surface 27 of the wall 16, and thereby limit the downward movement of the spout. The stop 26 is provided on the outer side of the spout and is adapted to engage the outer surface 28 of the wall 16, whereby the inner movement of the spout is limited. Over each of the spouts is secured to the walls 16, a hook 29, on one end 30, of the top wall 31, of the spout is another hook 32, to which hooks the opposing ends of a pull spring 33, is secured. The stops 25 and 26, are so spaced as to permit a predetermined rate of flow of the material contained in the bins to flow through a rear opening 23, of said spouts, whereby a certain quantity of the material contained in the bin will be displayed in the spout at such time as the same is in its uppermost or closed position. Mounted on the top of the cabinet is a stepped member 35, upon which bottles of seed of a fine character may be seated. Each of the spouts 22, is provided with a knob 36, on its side wall 37, whereby the spouts may be easily turned down to drop the contents thereof into a sack or other receptacle.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

A delivery cabinet including a body provided with a series of vertically arranged bins of similar construction formed with discharge openings and forwardly extending inclined bottoms terminating at the bottoms of said discharge openings, inwardly angled filler pieces disposed in the opposite front corners of each bin for directing the contents of the bins to said discharge openings, spouts hinged at the bottom of each discharge opening to the front of said cabinet for pivotal movement through said openings, said spouts including bottom surfaces and oppositely disposed sides being rounded and covered at their inner rear ends, spaced upwardly extending stops in each spout engageable with the edges of the bins at the upper edges of said discharge openings for limiting the movement of said spouts to a slanting or discharge position and to a horizontal or closed position, in which latter position the rear ends of the sides and the tops of the spouts will engage and seat on the bottoms of the bins to close off the flow of the bin contents to said spouts, and springs connected between each spout and the front of its bin to normally and resiliently hold the same in closed position.

ERWIN M. GULOW.

REFERENCES CITED

The following references are of record in the file of this patent:

UNITED STATES PATENTS

| Number | Name | Date |
|---|---|---|
| 205,934 | Wey | July 9, 1878 |
| 295,233 | Dall | Mar. 18, 1884 |
| 364,316 | Stacy | June 7, 1887 |
| 394,278 | McAnulty | Dec. 11, 1888 |
| 410,990 | Raymond | Sept. 10, 1889 |
| 927,060 | Leslie et al. | July 6, 1909 |
| 1,139,831 | Barrows | May 18, 1915 |
| 1,146,977 | Wadham | July 20, 1915 |
| 1,445,078 | Freeman | Feb. 13, 1923 |
| 1,898,416 | Wiseman | Feb. 21, 1933 |
| 2,081,725 | Ainsa | May 25, 1937 |

FOREIGN PATENTS

| Number | Country | Date |
|---|---|---|
| 535,160 | France | Jan. 20, 1922 |
| 590,235 | France | June 12, 1925 |